United States Patent
Gallagher et al.

(10) Patent No.: US 7,821,570 B2
(45) Date of Patent: Oct. 26, 2010

(54) ADJUSTING DIGITAL IMAGE EXPOSURE AND TONE SCALE

(75) Inventors: Andrew C. Gallagher, Brockport, NY (US); Nathan D. Cahill, West Henrietta, NY (US); Gabriel Fielding, Rochester, NY (US); Lawrence A. Ray, Rochester, NY (US); Edward B. Gindele, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1142 days.

(21) Appl. No.: 11/290,049

(22) Filed: Nov. 30, 2005

(65) Prior Publication Data

US 2007/0126921 A1  Jun. 7, 2007

(51) Int. Cl.
*H04N 5/238* (2006.01)
*H04N 5/232* (2006.01)
*H04N 5/235* (2006.01)

(52) U.S. Cl. ............. 348/364; 348/348; 348/221.1
(58) Field of Classification Search ........... 348/362, 348/371, 364, 207.99, 366, 365, 348, 208.14, 348/363, 370
See application file for complete search history.

(56) References Cited

U.S. PATENT DOCUMENTS

| | | | |
|---|---|---|---|
| 4,945,406 A | 7/1990 | Cok | |
| 5,189,460 A * | 2/1993 | Hayakawa | 396/123 |
| 5,471,987 A | 12/1995 | Nakazawa et al. | |
| 6,215,961 B1 * | 4/2001 | Mukai et al. | 396/100 |
| 6,438,264 B1 | 8/2002 | Gallagher et al. | |
| 6,507,665 B1 | 1/2003 | Cahill et al. | |
| 6,693,673 B1 * | 2/2004 | Tanaka et al. | 348/371 |
| 6,717,698 B1 | 4/2004 | Lee | |
| 6,728,416 B1 * | 4/2004 | Gallagher | 382/265 |
| 6,931,131 B1 | 8/2005 | Becker, Jr. et al. | |
| 2004/0096103 A1 | 5/2004 | Gallagher et al. | |
| 2005/0157204 A1 * | 7/2005 | Marks | 348/370 |

FOREIGN PATENT DOCUMENTS

| | | |
|---|---|---|
| EP | 1 102 210 | 5/2001 |
| EP | 1 209 621 | 5/2002 |
| WO | WO 96/14621 | 5/1996 |

OTHER PUBLICATIONS

Jones et al, Fast Multi-view Face Detection, IEEE Conf. on Computer Vision and Pattern Recognition (CVPR), Jun. 2003.
Harley and Zisserman in "Multiple View Geometry", pp. 13-14, 2000.

* cited by examiner

*Primary Examiner*—David L Ometz
*Assistant Examiner*—Ahmed A Berhan
(74) *Attorney, Agent, or Firm*—Raymond L. Owens

(57) ABSTRACT

A method of adjusting exposure of a digital camera based on range information, including a digital camera capturing a first digital image at a selected exposure of a scene having objects; providing range information having two or more range values indicating the distance from the digital camera to objects in the scene; using the range information and pixel values of the captured digital image to determine an exposure adjustment amount for the selected exposure; and applying the exposure adjustment amount to the digital image to produce a second digital image with adjusted exposure.

12 Claims, 12 Drawing Sheets

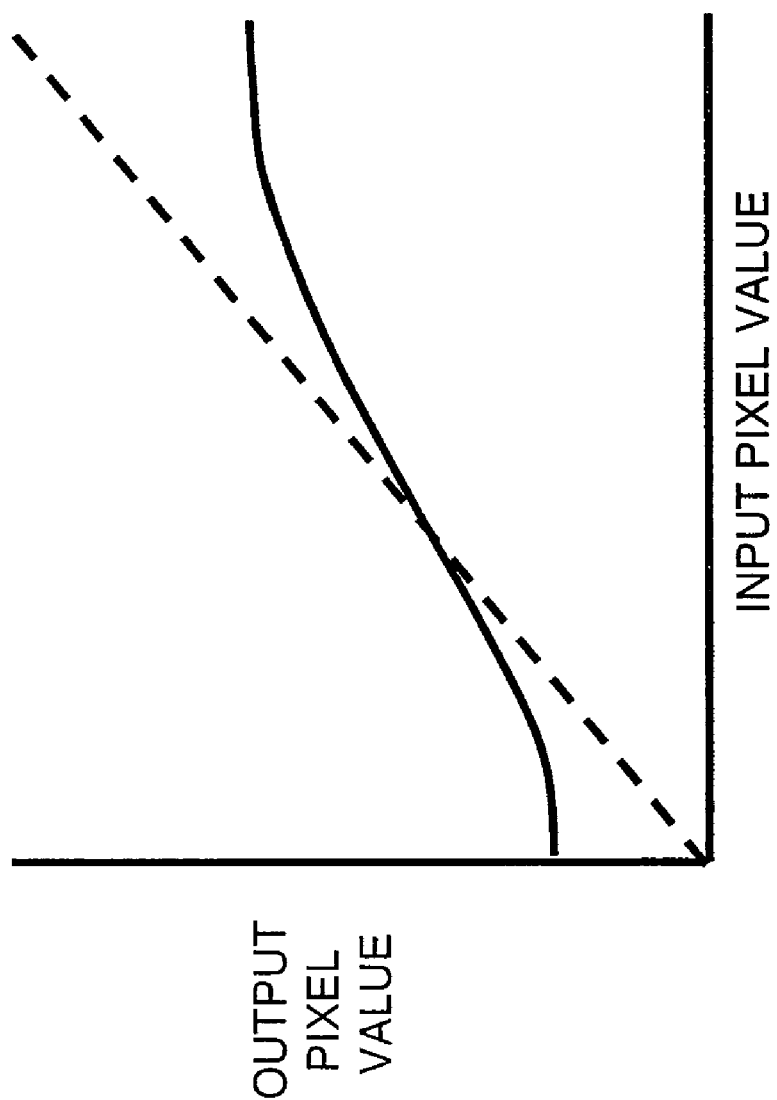

ADJUSTING DIGITAL IMAGE EXPOSURE AND TONE SCALE

CROSS REFERENCE TO RELATED APPLICATIONS

Reference is made to commonly assigned U.S. patent application Ser. No. 11/290,016 filed Nov. 30, 2005, now abandoned entitled "Detecting Objects of Interest in Digital Images" by Andrew C. Gallagher et al and U.S. patent application Ser. No. 11/290,213 filed Nov. 30, 2005 (U.S. Patent Application Publication No. 2007/0126876) entitled"Locating Digital Image Planar Surfaces" by Andrew C. Gallagher et al, the disclosures of which are incorporated herein.

FIELD OF INVENTION

The field of the invention relates to digital cameras and image processing for exposure adjustment and tone scale adjustment based on range information.

BACKGROUND OF THE INVENTION

Current imaging systems have many deficiencies in that, one an image is captured, the image is often not pleasing because of exposure, tone scale.

The dynamic range of images captured on one medium (such as negative film) may exceed the dynamic range of the medium that the image is rendered on (such as photographic paper). This results in a loss of image detail in the rendered image. The detail may be lost in the highlight portion of the image (such as when a backlit image is printed light enough to properly render the shadow detail, but rendered too light to show the highlight detail such as the clouds in the sky). Or the detail may be lost in the shadow portion of the image (such as when a "flash-in-the-face" image is rendered properly for the subject of the picture, but the background is rendered too dark to show the detail in the background).

These problems are addressed by the process of exposure adjustment (either adjusting the exposure of the camera for capturing an image, or by adjusting the exposure of a captured image). The exposure of the image is determined such that the lightness of the image's subject is optimally reproduced on the rendered medium. Typical exposure adjustment algorithm use statistics to estimate a correct exposure for an image. This exposure is often not optimal due to the face that the subject of the image is not known.

It is well known that the dynamic range of photographic paper is less than the typical scene dynamic range. The result of this incongruity is that a good deal of scene content is rendered to black or white on the photographic print. For this reason, in an image-processing environment, a tone scale function may be used to reduce the scene dynamic range in order to map more information onto the display medium. There exist many processes for creating a tone scale function on an image dependent basis (e.g., see, U.S. Pat. No. 5,471, 987 to Nakazawa et al. (hereinafter "Nakazawa"), incorporated herein by reference). Each of the conventional tone scale function processes examines certain statistical characteristics of the image under consideration in order to automatically generate the tone scale function. In addition, tone scale functions may be generated with manual interactive tools. However, these methods suffer because only the values of image pixels are known. For example, it is difficult to determine whether a dark pixel is the result of only a small amount of exposure to the subject, or because the subject had a low amount of reflectance.

SUMMARY OF THE INVENTION

It is an object of the present invention to adjust for exposure or tone scale based on range information.

This object is achieved for exposure adjustment by a method of adjusting exposure of a digital camera based on range information, comprising:

(a) a digital camera capturing a first digital image at a selected exposure of a scene having objects;

(b) providing range information having two or more range values indicating the distance from the digital camera to objects in the scene;

(c) using the range information and pixel values of the captured digital image to determine an exposure adjustment amount for the selected exposure; and (d) applying the exposure adjustment amount to the digital image to produce a second digital image with adjusted exposure.

This object is achieved for tone scale adjustment by a method of adjusting tone scale of a captured digital image of a scene having objects, comprising:

(a) providing range information having two or more range values indicating the distance of objects in the scene;

(b) using the range information and pixel values of the captured digital image to determine a tone scale adjustment; and (c) applying the tone scale adjustment to the captured digital image to produce a second digital image with adjusted tone scale.

It is an advantage of the present invention that by using range information effective exposure adjustments can be produced that provide improved balanced images.

It is another advantage of the present invention that by using range information effective tone scale adjustments can be produced that provide images having improved tonal rendition.

BRIEF DESCRIPTION OF THE DRAWINGS

FIG. 6D is a plot of a tone scale function that should the relationship between input and output pixel values;

DETAILED DESCRIPTION OF THE INVENTION

Figure 1:
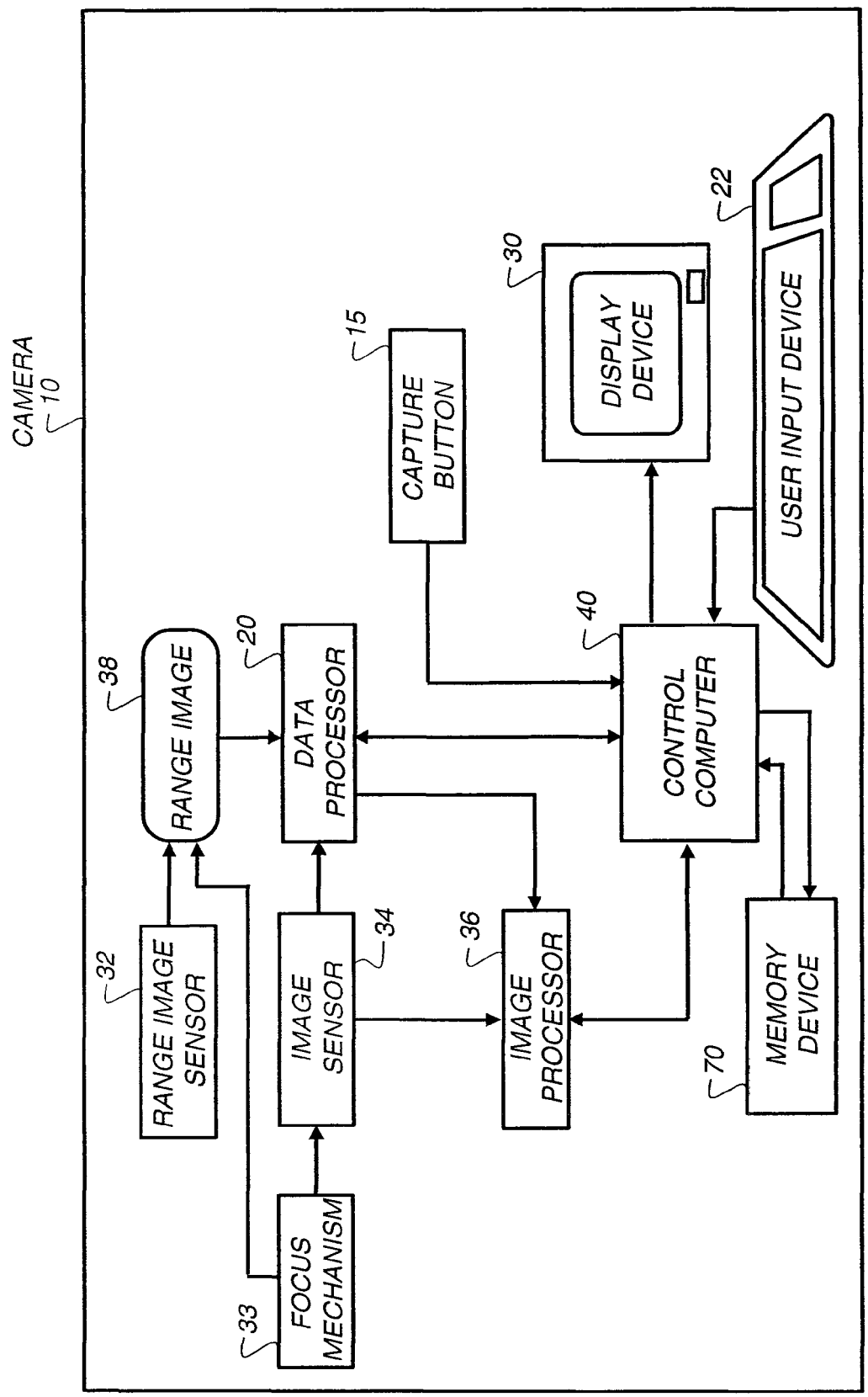
FIG. 1 is a block diagram of an imaging system that can implement the present invention.

FIG. 1 shows the inventive digital camera 10. The camera 10 includes user inputs 22. As shown, the user inputs 22 are buttons, but the user inputs 22 could also be a joystick, touch screen, or the like. The user uses the user inputs 22 to command the operation of the camera 10, for example by selecting a mode of operation of the camera. The camera 10 also includes a display device 30 upon which the user can preview images captured by the camera 10 when the capture button 15 is depressed. The display device 30 is also used with the user inputs 22 so that the user can navigate through menus. The display device 30 can be, for example, a LCD or OLED screen, as are commonly used on digital cameras. The menus allow the user to select the preferences for the camera's operation. The camera 10 can capture either still images or images in rapid succession such as a video stream.

Those skilled in the art will recognize that although in the preferred embodiment a data processor 20, image processor 36, user input 22, display device 30, and memory device 70 are integral with the camera 10, these parts may be located external to the camera. For example, the aforementioned parts may be located in a desktop computer system, or on a kiosk capable of image processing located for example in a retail establishment.

A general control computer 40 shown in FIG. 1 can store the present invention as a computer program stored in a computer readable storage medium, which may comprise, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program indicated by memory device 70. The control computer 40 is responsible for controlling the transfer of data between components of the camera 10. For example, the control computer 40 determines that the capture button 15 is pressed by the user and initiates the capturing of an image by an image sensor 34. The camera 10 also includes a focus mechanism 33 for setting the focus of the camera.

A range image sensor 32 generates a range image 38 indicating the distance from the camera's nodal point to the object in the scene being photographed. The range image will be described in more detail hereinbelow. Those skilled in the art will recognize that the range image sensor 32 may be located on a device separate from the camera 10. However, in the preferred embodiment, the range image sensor 32 is located integral with the camera 10.

The image processor 36 can be used to process digital images to make adjustments for overall brightness, tone scale, image structure, etc. of digital images in a manner such that a pleasing looking image is produced by an image display device 30. Those skilled in the art will recognize that the present invention is not limited to just these mentioned image processing functions.

The data processor 20 is used to process image information from the digital image as well as the range image 38 from the range image sensor 32 to generate metadata for the image processor 36 or for the control computer 40. The operation of the data processor 20 will be described in greater detail hereinbelow.

It should also be noted that the present invention can be implemented in a combination of software and/or hardware and is not limited to devices that are physically connected and/or located within the same physical location. One or more of the devices illustrated in FIG. 1 may be located remotely and may be connected via a wireless connection.

A digital image is comprised of one or more digital image channels. Each digital image channel is comprised of a two-dimensional array of pixels. Each pixel value relates to the amount of light received by the imaging capture device corresponding to the physical region of the pixel. For color imaging applications, a digital image will often consist of red, green, and blue digital image channels. Motion imaging applications can be thought of as a sequence of digital images. Those skilled in the art will recognize that the present invention can be applied to, but is not limited to, a digital image channel for any of the above mentioned applications. Although a digital image channel is described as a two dimensional array of pixel values arranged by rows and columns, those skilled in the art will recognize that the present invention can be applied to non rectilinear arrays with equal effect. Those skilled in the art will also recognize that for digital image processing steps described hereinbelow as replacing original pixel values with processed pixel values is functionally equivalent to describing the same processing steps as generating a new digital image with the processed pixel values while retaining the original pixel values.

Figure 2A:
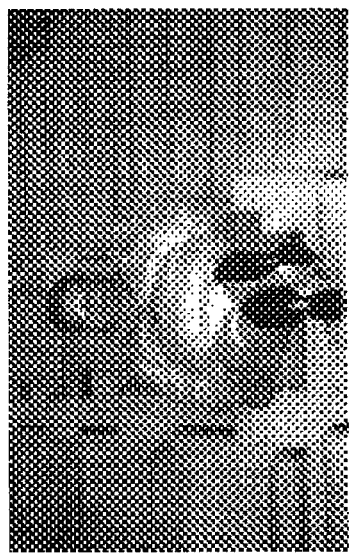
FIG. 2A is an example image.
Figure 2B:
FIG. 2B is an example range image corresponding to the image in FIG. 2A.

FIG. 2A shows an example digital image and the depth image corresponding with the image is shown in FIG. 2B. Lighter shades indicate further distance from the image plane.

A digital image D includes pixel values that describe the light intensity associated with a spatial location in the scene. Typically, in a digital color image, the light intensity at each (x,y) pixel location on the image plane is known for each of the red, green, and blue color channels.

A range image 38 R directly encodes the positions of object surfaces within the scene. A range map contains range information related to the distance between a surface and a known reference frame. For example, the range map may contain pixel values where each pixel value (or range point) is a 3 dimensional [X Y Z] position of a point on the surface in the scene. Alternatively, the pixel values of the range map may be the distance between the camera's nodal point (origin) and the surface. Converting between representations of the range map is trivial when the focal length f of the camera is known. For example, the range map pixel value is $R(x,y)=d$ Where d indicates the distance from the camera's nodal point to the surface in the scene.

This range map pixel values can be converted to the true position of the surface by the relationship $X=(x*d)/\text{sqrt}(x*x+y*y)$ $Y=(y*d)/\text{sqrt}(x*x+y*y)$ $Z=(f*d)/\text{sqrt}(x*x+y*y)$ Where sqrt( ) is the square root operator.

The range map may have the same dimensions at the digital image. That is, for each pixel of the digital image, there may be an associated range pixel value. Alternatively, the range map may exist over a more coarse resolution grid than the digital image. For example, a range map R having only 8 rows and 12 columns of pixels may be associated with digital image D having 1000 rows by 1500 rows of pixels. A range map R must contain at least 2 distinct range points. Further, the range map may include only a list of a set of points scattered across the image. This type of range map is also called a sparse range map. This situation often results when the range map is computed from a stereo digital image pair, as described in U.S. Pat. No. 6,507,665.

Figure 2C:
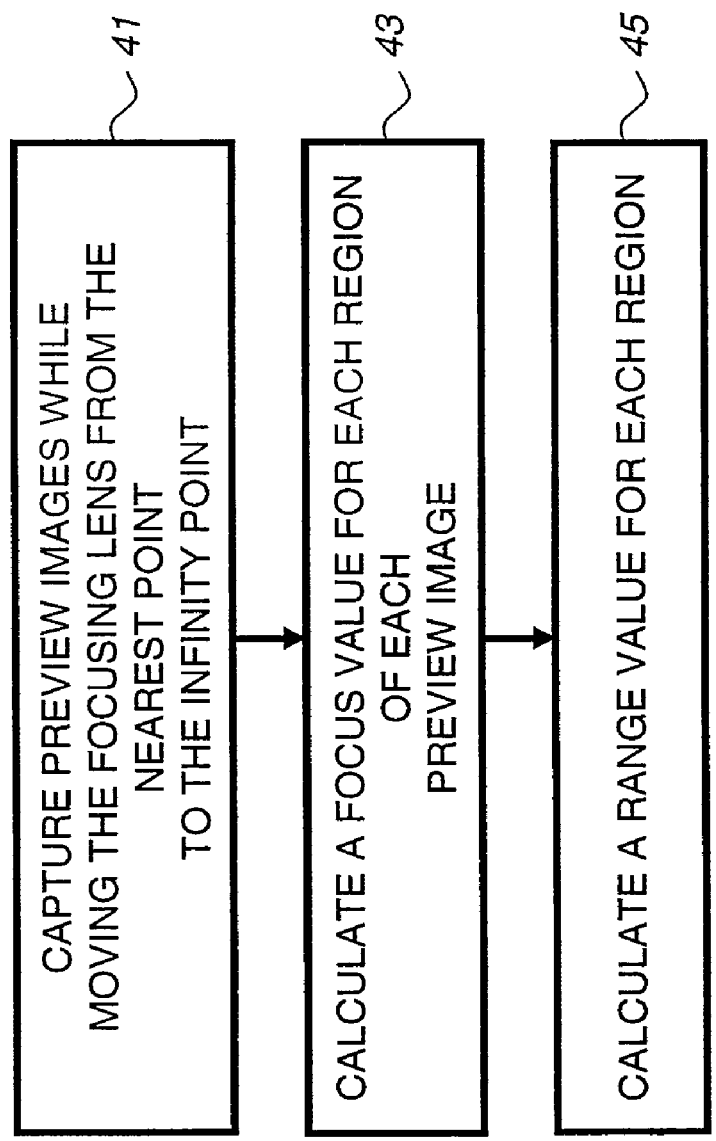
FIG. 2C is a flow chart that describes a method for generating a range image.

The focus mechanism 33 can be employed to generate the range image 38, as shown in FIG. 2C. The focus mechanism 33 is used to select the focus position of the camera's lens system by capturing a set (for example 10) of preview images with the image sensor 34 while the lens system focus is adjusted from a near focus position to a far focus position, as shown in a first step 41. In the second step 43, the preview images are analyzed by computing a focus value for each region (e.g. 8×8 pixel block) of each preview image. The focus value is a measure of the high frequency component in a region of an image. For example, the focus value is the standard deviation of pixel values in a region. Alternatively, the focus value can be the mean absolute difference of the region, of the maximum minus the minimum pixel value of the region. This focus value is useful because of the face that an in-focus image signal contains a greater high frequency component than an out-of-focus image signal. The focus mechanism 33 then determines the preview image that maximizes the focus value over a relevant set of regions. The focus position of the camera 10 is then set according to the focus position associated with the preview image that maximizes the focus value.

In the third step 45, the maximum focus value is found by comparing the focus values for that region for each of the preview images. The range map value associated with the region is equal to the corresponding focus distance of the preview image having the maximum focus value for the region.

In this manner, the focus mechanism 33 analyzes data from the image sensor 34, and determines the range image 38. A separate range image sensor 32 is then not necessary to produce the range image 38.

The range pixel value for a pixel of digital image may be determined by interpolation or extrapolation based on the values of the range map, as is commonly known in the art. The interpolation may be for example performed with a bilinear or bicubic filtering technique, or with a non-linear technique such as a median filter. Likewise, the digital image data D may be interpolated to determine an approximate image intensity value at a given position for which the range information is known. However, it must be noted that the interpolation or extrapolation of range data cannot be accomplished without error.

Figure 3:
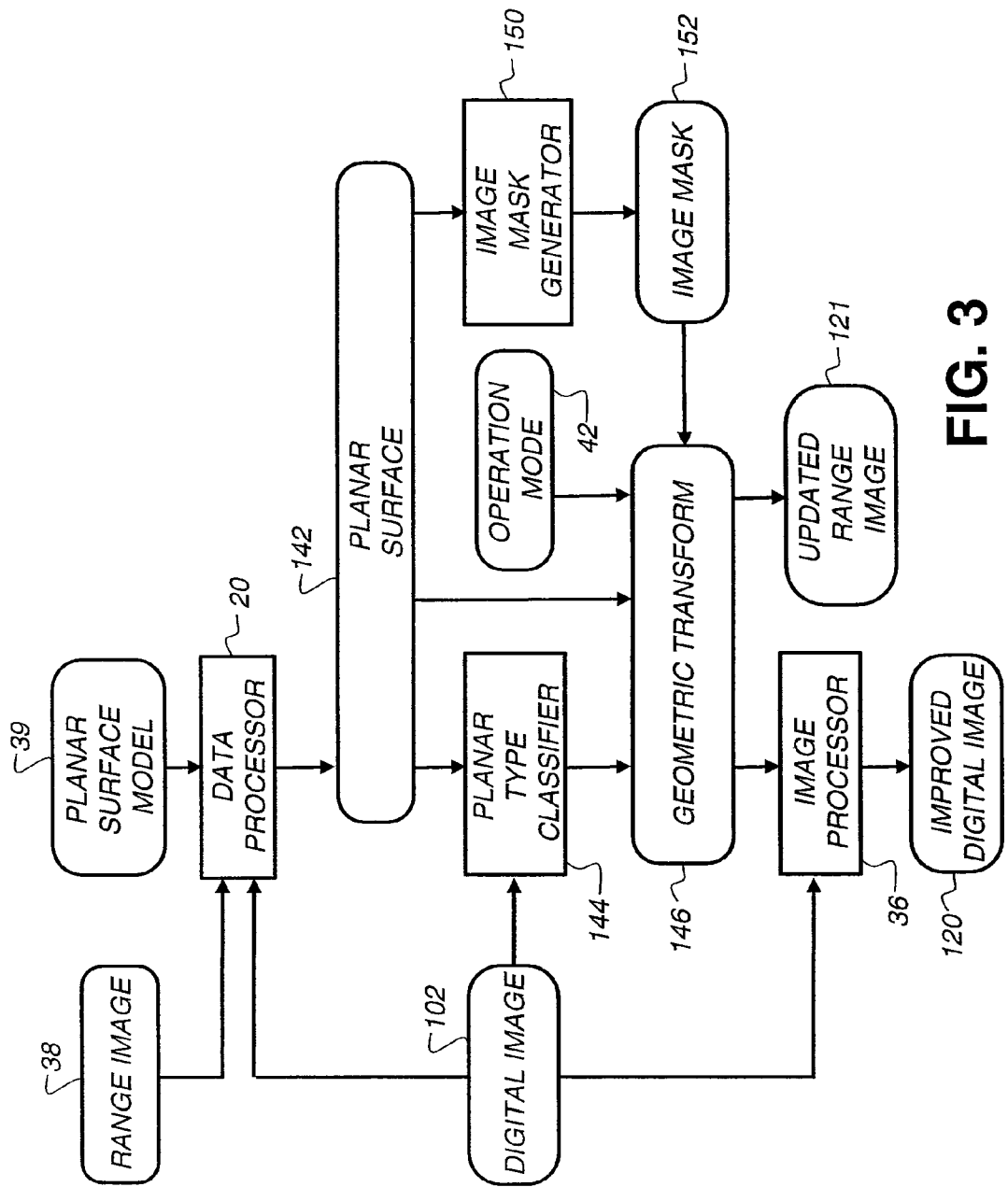
FIG. 3 is a flow chart of an embodiment of the present invention for detecting and classifying planar surfaces and creating geometric transforms.

In FIG. 3, there is a shown a more detailed view of the system from FIG. 1. The range image 38 is input to the data processor 20 to extract planar surfaces 142. The data processor 20 uses a planar surface model 39 to locate planar surfaces from the range information of the range image 38. The planar surface model 39 is a mathematical description of a planar surface, or a surface that is approximately planar. Knowledge of planar surfaces in a scene provides an important clue about the scene and the relationship between the camera position with respect to the scene.

The following robust estimation procedure is described by the planar surface model 39 and is used by the data processor 20 to detect planar surfaces in a scene based on the range image:

a) Triplets of range points $R_i = [X_i\ Y_i\ Z_i]^T$ where i=0,1,2 are considered. The triplets may be selected at random.

b) For each triplet of range points the following steps are performed:

b1) The triplet of points is checked for collinearity. When three points lie in a line, a unique plane containing all three points cannot be determined. The three points are collinear when:

$$|R_O R_1 R_2| = 0$$

In the case the triplet of points is collinear, the triplet is rejected and the next triplet of points is considered.

b2) The plane P passing through each of the three points is computed by well-known methods. The plane P is represented as:

$P = [x_p\ y_p\ z_p\ c]^T$ and is such that $$P^T \begin{bmatrix} R_i \\ 1 \end{bmatrix} = 0 \text{ for } i = 0, 1, 2 \qquad (1)$$

Coefficients $x_p$, $y_p$ and $z_p$ can be found for example by computing the cross product of vectors $R_1 - R_0$ and $R_2 - R_0$. Then coefficient c can be found by solving equation (1).

b3) For computed plane P, the number N of range points from the entire range image 38 for which $|P^T [X\ Y\ Z\ 1]^T|$ is not greater than $T_1$ is found. $T_1$ is a user selectable threshold that defaults to the value $T_1 = 0.05\ Z$. The value of $T_1$ may be dependent on an error distribution of the range image 38.

c) Choose the plane P having the largest N, if that N is greater then $T_2$, (default $T_2 = 0.2$*total number of range points in the range image 38).

d) Estimate the optimal P from the set of N range points that satisfy the condition in b3) above. This is accomplished by solving for the P that minimizes error term E:

$$\begin{bmatrix} \begin{bmatrix} R_0^T & 1 \\ R_1^T & 1 \\ \cdots & 1 \\ R_N^T & 1 \end{bmatrix} P \end{bmatrix}^T \begin{bmatrix} R_0^T & 1 \\ R_1^T & 1 \\ \cdots & 1 \\ R_N^T & 1 \end{bmatrix} P = E$$

Techniques for solving such optimization problems are well known in the art and will not be discussed further.

The procedure preformed by the data processor 20 for finding planar surfaces can be iterated by eliminating range points associated with detected planar surfaces P and repeating to generate a set of planar surfaces 142.

Knowledge of the planar surfaces in the image enable several image enhancement algorithms, as shown in FIG. 3. First, the planar surfaces 142 determined by the data processor 20 are input to a planar type classifier 144 for classifying the planar surfaces according to type and/or according to semantic label. Many planar or nearly planar surfaces exist in human construction. For example, floors are nearly always planar and parallel to the ground (i.e. the normal vector to most planar floors is the direction of gravity). Ceilings fall into the same category. An obvious difference is that ceilings tend to be located near the top of a digital image while floors are generally located near the bottom of a digital image. Walls are usually planar surfaces perpendicular to the ground plane. (i.e. the normal vector is parallel to the ground). Many other planar surfaces exist in photographed scenes such as the sides or top of refrigerators or tables, or planar surfaces that are neither parallel nor perpendicular to the ground (e.g. a ramp).

The planar type classifier 144 analyzes the planar surface and additional information from a digital image 102 to determine a classification for the detected planar surface 142. The classification categories are preferably:

Wall (i.e. plane perpendicular to ground plane)

Ceiling (i.e. plane parallel to ground plane and located near image top)

Floor (i.e. plane parallel to ground plane and located near image bottom)

Other (neither parallel nor perpendicular to the ground).

The planar type classifier 144 may assign a probability or belief that the planar surface belongs to a particular category. Typically, large planar surfaces having small absolute values for $y_p$ are classified as either ceiling or floor planar surfaces depending on the location of the range values that were found to fall on the plane P during the planar surface detection preformed by the data processor 20. Large planar surfaces having small absolute values for $x_p$ are classified as walls. Otherwise, the planar surface is classified as "other".

FIG. 3 shows that a geometric transform 146 may be applied to the digital image 102 to generate an improved digital image 120. The geometric transform 146 is preferably generated using the detected planar surface 142 and planar type classification 144.

The operation of the geometric transform 146 depends on an operation mode 42. The operation mode 42 allows a user to select the desired functionality of the geometric transform 146. For example, if the operation mode 42 is "Reduce Camera Rotation", then the intent of the geometric transform 146 is to perform a rotation of the digital image 102 to counter-act the undesirable effects of an unintentional camera rotation (rotation of the camera about the z-axis so that it is not held level). The geometric transform 146 in this case is the homography $H_{1R}$ $$H_{1R} = \begin{bmatrix} \cos\alpha & -\sin\alpha & 0 \\ \sin\alpha & \cos\alpha & 0 \\ 0 & 0 & 1 \end{bmatrix} \quad (2)$$

when $P=[x_p\ y_p\ z_p\ c]^T$ is a known planar surface that is either a ceiling or a floor, then $$\alpha = -\left(\mathrm{mod}\left(\tan^{-1}(y_P, x_P), \frac{\pi}{2}\right) - \frac{\pi}{4}\right) \quad (3)$$

Alternatively, the angle $\alpha$ can be determined from two or more planar surfaces that are walls by computing the cross product of the normal vectors associated with the walls. The result is the normal vector of the ground plane, which can be used in (3) above.

The transform $H_{1R}$ is used to remove the tilt that is apparent in images when the camera is rotated with respect to the scene. When the camera is tilted, the planar surfaces of walls, ceilings, and floors undergo predictable changes. This is because the orientation of such planar surfaces are known ahead of time (i.e. either parallel to the ground plane or parallel to it.) The angle $\alpha$ represents the negative of the angle of rotation of the camera from a vertical orientation, and the transform $H_{1R}$ is applied by the image processor 36 to produce an enhanced digital image 120 rotated by angle $\alpha$ relative to the original image 102, thereby removing the effect of undesirable rotation of the camera from the image.

Alternatively, if the operation mode 42 is "Rectify Plane", then the intent of the geometric transform 146 is to perform a rectification of the image of the detected planar surface 142. Perspective distortion occurs during image capture and for example parallel scene lines appear to converge in an image. Rectification is the process of performing a geometric transform to remove perspective distortion from an image of a scene plane, resulting in an image as if captured looking straight at the plane. In this case, the geometric transform is a homography $H_{RP}$. As described by Harley and Zisserman in "Multiple View Geometry", pp. 13-14, a homography can be designed to perform rectification when four non-collinear corresponding point are known (i.e. 4 pairs of corresponding points in the image plane coordinated and the scene plane coordinates where no 3 points are collinear). These correspondence points are generated by knowing the equation of planar surface $P=[x_p\ y_p\ z_p\ c]^T$. The coordinate system on the planar surface must be defined. This is accomplished by selecting two unit length orthogonal basis vectors on the planar surface. The normal to the planar surface is $P_N=[x_p\ y_p\ z_p]^T$. The first basis vector is conveniently selected as $P_{B1}=[0\ y_1\ z_1]^T$ such that the dot product of $P_N$ and $P_{B1}$ is 0 and $P_{B1}$ has unit length. The second basis vector PB2 is derived by finding the cross product of $P_N$ and $P_{B1}$ and normalizing to unit length. The 4 correspondence points are then found by choosing 4 noncollinear points on the planar surface, determining the coordinates of each point on the planar surface by computing the inner product of the points and the basis vectors, and computing the location of the projection of the points in image coordinates.

For example, if the planar surface has equation: $P=[1\ 2\ 1\ -5]^T$, then the planar basis vectors are $P_{B1}=[0\ 1/\sqrt{5}\ -2/\sqrt{5}]^T$ and $P_{B2}=[-5/\sqrt{302}/\sqrt{301}/\sqrt{30}]^T$. Suppose the focal length is 1 unit. Then, four correspondence points can be determined:

| Scene Coordinate | Scene Plane Coordinate | Image Plane Coordinates |
|---|---|---|
| $[0\ 0\ 5]^T$ | $[-2\sqrt{5}\ 5/\sqrt{30}\ 1]^T$ | $[0\ 0\ 1]^T$ |
| $[1\ 0\ 4]^T$ | $[-8\sqrt{5}\ -1/\sqrt{30}\ 1]^T$ | $[\tfrac{1}{4}\ 0\ 1]^T$ |
| $[0\ 1\ 3]^T$ | $[-\sqrt{5}\ 5/\sqrt{30}\ 1]^T$ | $[0\ \tfrac{1}{3}\ 1]^T$ |
| $[1\ 1\ 2]^T$ | $[-3\sqrt{5}\ -1/\sqrt{30}\ 1]^T$ | $[\tfrac{1}{2}\ \tfrac{1}{2}\ 1]^T$ |

The homography $H_{RP}$ that maps image coordinates to rectified coordinates can be computed as:

$$H_{RP} = \begin{bmatrix} 0 & 0.447 & -0.894 \\ -3.83 & 1.83 & 0.913 \\ -3.0 & 2.0 & 1.0 \end{bmatrix}$$

Therefore, it has been demonstrated that the geometric transform 146 for rectifying the image of the scene planar surface can be derived using the equation of the planar surface 142.

Note that the geometric transform 142 may be applied to only those pixels of the digital image 102 associated with the planar surface 142, or the geometric transform 146 may be applied to all pixels of the digital image 102. An image mask generator 150 may be used to create an image mask 152 indicating those pixels in the digital image 102 that are associated with the planar surface 142. Preferably, the image mask 152 has the same number of rows and columns of pixels as the digital image 102. A pixel position is associated with the planar surface 142 if its associated 3 dimensional position falls on or near the planar surface 142. Preferably, a pixel position in the image mask 152 is assigned a value (e.g. 1) if associated with a planar surface 142 and a value (e.g. 0) otherwise. The image mask 152 can indicate pixels associated with several different planar surfaces by assigning a specific value for each planar surface (e.g. 1 for the first planar surface, 2 for the second planar surface, etc.).

In addition to its usefulness for applying geometric transforms 146, the image mask 152 is useful to a material/object detector 154 as well. The material/object detector 154 determines the likelihood that pixels or regions (groups of pixels) of a digital image 102 represent a specific material (e.g. sky, grass, pavement, human flesh, etc.) or object (e.g. human face, automobile, house, etc.) This will be described in greater detail hereinbelow.

The image processor 36 applies the geometric transform 146 to the digital image 102 i(x,y) with X rows and Y columns of pixels to produce the improved digital image 120. Preferably, the position at the intersection of the image plane and the optical axis (i.e. the center of the digital image 102) has coordinates of (0,0). Preferably, the improved digital image o(m,n) has M rows and N columns and has the same number of rows and columns of pixels as the digital image 102. In other words, M=X and N=Y. Each pixel location in the output image $o(m_o, n_o)$ is mapped to a specific location in the input digital image $i(x_o, y_o)$. Typically, $(x_o, y_o)$ will not correspond to an exact integer location, but will fall between pixels on the input digital image i(x,y). The value of the pixel $o(m_o, n_o)$ is determined by interpolating the value from the pixel values nearby $i(x_o, y_o)$. This type of interpolation is well known in the art of image processing and can be accomplished by nearest neighbor interpolation, bilinear interpolation, bicubic interpolation, or any number of other interpolation methods.

The geometric transform 146 governs the mapping of locations (m,n) of the output image to locations (x,y) of the input image. In the preferred embodiment the mapping, which maps a specific location $(m_o, n_o)$ of the output image to a location $(x_o, y_o)$ in the input image, is given as:

$$\begin{bmatrix} x_t \\ y_t \\ w_t \end{bmatrix} = H^{-1} \begin{bmatrix} m_0 \\ n_0 \\ 1 \end{bmatrix} \quad (8)$$

where $[x_t y_t w_t]^t$ represents the position in the original digital image 102 in homogenous coordinates. Thus, $$x_0 = \frac{x_t}{w_t}$$

and $$y_0 = \frac{y_t}{w_t}$$

Those skilled in the art will recognize that the point $(x_o, y_o)$ may be outside the domain of the input digital image (i.e. there may not be any nearby pixels values). In the other extreme, the entire collection of pixel positions of the improved output image could map to a small region in the interior of the input image 102, thereby doing a large amount of zoom. This problem can be addressed by the image processor 36 determining a zoom factor z that represents the zooming effect of the geometric transform 146 and final $H_f$ is produced by modifying the geometric transform 146 input to the image processor 36 as follows:

$$H_f = \begin{bmatrix} zh_{11} & zh_{12} & h_{13} \\ zh_{21} & zh_{22} & h_{23} \\ h_{31} & h_{32} & h_{33} \end{bmatrix} \quad (9)$$

where $$H = \begin{bmatrix} h_{11} & h_{12} & h_{13} \\ h_{21} & h_{22} & h_{23} \\ h_{31} & h_{32} & h_{33} \end{bmatrix}$$

where z is the largest number for which all pixel positions of the output improved digital image 120 map inside the domain of the input digital image 102.

As with all resampling operations, care must be exercised to avoid aliasing artifacts. Typically, aliasing is avoided by blurring the digital image 102 before sampling. However, it can be difficult to choose the blurring filter as the sampling rate from the geometric transform 146 varies throughout the image. There are several techniques to deal with this problem. With supersampling or adaptive supersampling, each pixel value $o(m_o, n_o)$ can be estimated by transforming a set of coordinate positions near $(m_o, n_o)$ back to the input digital image 102 for interpolation. For example, a set of positions $[(m_o+\frac{1}{3}, n_o+\frac{1}{3}) (m_o+\frac{1}{3}, n_o) (m_o+\frac{1}{3}, n_o-\frac{1}{3}) (m_o, n_o+\frac{1}{3}) (m_o, n_o) (m_o, n_o+\frac{1}{3}) (m_o-\frac{1}{3}, n_o+\frac{1}{3}) (m_o-\frac{1}{3}, n_o) (m_o-\frac{1}{3}, n_o \frac{1}{3})]$ can be used. The final pixel value $o(m_o, n_o)$ is a linear combination (e.g. the average) of all the interpolated values associated with the set of positions transformed into the input image 102 coordinates.

The aforementioned geometric transforms 146 ("reduce camera rotation" and "rectify plane") are represented with 3×3 matrices and operate on the image plane coordinates to produce an improved digital image 120. A more flexible geometric transform uses a 3×4 matrix and operates on the 3 dimensional pixel coordinates provided by the range image 38. Applications of this model enable the rotation of the scene around an arbitrary axis, producing an improved digital image that appears as if it were captured from another vantage point.

The 3×4 geometric transform 146 is may be designed using the output of the planar type classifier 144 to for example position a "floor" plane so that its normal vector is [1 0 0] or a "wall" plane so that its normal vector is orthogonal to the x-axis.

During application, when populating the pixel values of the improved digital image 120, it may be found that no original 3 dimensional pixel coordinates map to a particular location. These locations must be assigned either a default value (e.g. black or white) or a computed value found by an analysis of the local neighborhood (e.g. by using a median filter).

In addition, it may also be found that more than one pixel value from the improved digital image 120 map to a single location in the improved digital image 120. This causes a "dispute". The dispute is resolved by ignoring the pixel values that associated with distances that are farthest from the camera. This models the situation where objects close to a camera occlude objects that are further away from the camera 10.

Note that in every case, the geometric transform 146 may be applied to the range image 38 in addition to the digital image 102 for the purpose of creating an updated range image 121. The updated range image 121 is the range image that corresponds to the improved digital image 120.

Figure 4:
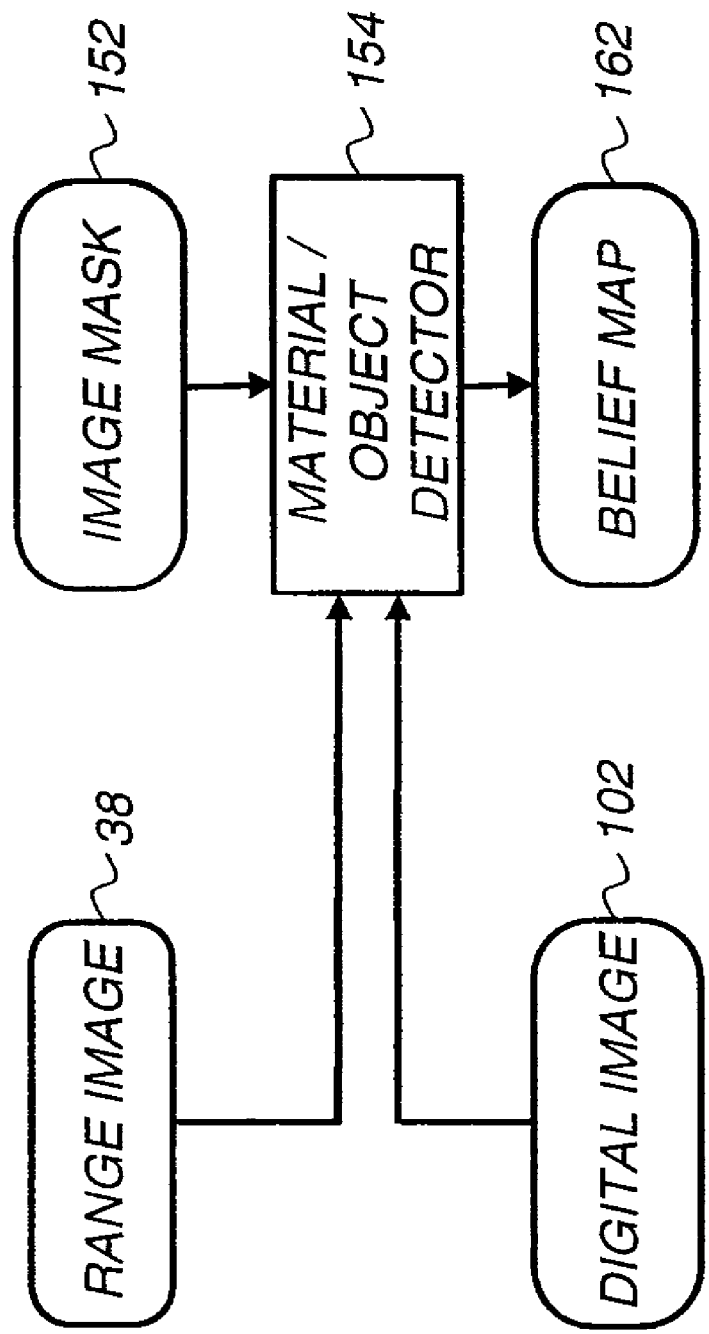
FIG. 4 is a flow chart of an embodiment of the present invention for detecting objects in digital images.

FIG. 4 shows a method for using the range image 38 for recognizing objects and materials in the digital image 102.

The range image 38 and the digital image 102 are input to a material/object detector 154. The material/object detector 154 determines the likelihood that pixels or regions (groups of pixels) of digital image 102 represent a specific material (e.g. sky, grass, pavement, human flesh, etc. ) or object (e.g. human face, automobile, house, etc.) The output of the material /object detector 154 is one or more belief map(s) 162. The belief map 162 indicates the likelihood that a particular pixel or region or pixels of the digital image represent a specific material or object. Preferably, the belief map 162 has the same number of rows and columns of pixels as the digital image 102, although this is not necessary. For some applications, it is convenient for the belief map 162 to have lower resolution than the digital image 102.

The material/object detector 154 can optionally input the image mask 152 that indicates the location of planar surfaces as computed by the image mask generator 150 of FIG. 3. The image mask 152 is quite useful for material/object recognition. For example, when searching for human faces in a digital image 102, the image mask can be used to avoid falsely detecting human faces in regions of the digital image 102 associated with a planar surface. This is because the human face is not planar, so regions of the digital image 102 associated with a planar surface need not be searched.

There are several modes of operation for the material/object detector 154. In the first, called "confirmation mode", a traditional material/object detection stage occurs using only the digital image 102. For example, the method for finding human faces described by Jones, M. J.; Viola, P., "Fast Multiview Face Detection", *IEEE* Conference on Computer Vision and Pattern Recognition (*CVPR*), June 2003, can be used. Then, when an object is detected, the distance to the object is estimated using the detected object and camera capture information (such as the focal length or magnification of the camera). For example, if the detected object is a human face, then when a candidate human face is detected in the image the distance to the face can also be determined because there is only a small amount of variation in human head sizes. An estimate of the camera to object distance $D_e$ for a candidate object of interest in the image can be computed as:

$$D_e = f/X*S$$

Where:

f is the focal length of the camera,

X is the size of the candidate object of interest in the digital image

S is the physical (known) size of the object of interest

Classification is done by comparing the estimate of camera to object distance $D_e$ with the corresponding range values for the candidate object of interest. When $D_e$ is a close match (e.g. within 15%) with the range values, then there is high likelihood that the candidate object of interest actually represents the object of interest. When $D_e$ is not a close match (e.g. within 15%) with the range values, then there is high likelihood that the candidate object of interest actually does not represent the object of interest.

In essence, the physical size of the object of interest (the head) is known. This computed distance can be compared with the distance from the camera to the subject from the range image 38 over the region corresponding to the candidate detected face. When there is a disparity between the computed distance and the distance from the range image 38, the confidence that the candidate human face is actually a human face is reduced, or the candidate human face is classified as "not a face". This method improves the performance of the material/object detector 154 by reducing false positive detections. This embodiment is appropriate for detecting objects with a narrow size distribution, such as cars, humans, human faces, etc. Also, range images have a distance of "infinity" or very large distances for regions representing sky. Therefore, when a candidate sky region is considered, the corresponding range values are considered. When the range values are small, then the candidate sky region is rejected. To summarize, FIG. 4 describes a method for improving object detection results by first detecting a candidate object of interest in the image, then determining range values corresponding to the detected object of interest and using these range values and the known size of the object of interest to determine the correctness of (i.e. to classify ) the detected object of interest.

In the second mode of operation, called "full model mode", the range image 38 simply provides additional features to input to a classifier. For a region of the image, features are calculated (e.g. distributions of color, texture, and range values) and input to a classifier to determine P(region=m|f), meaning the probability that the region represents material or object m, given the features f The classifier undergoes a training process by learning the distribution P(region=m|f) from many training examples, including samples where the region is known to represent material or object m and samples where the region is known to not represent material or object m. For example, using Bayes theorem:

$$P(\text{region} = m \mid f) = \frac{P(f \mid \text{region} = m)P(\text{region} = m)}{P(f \mid \text{region} = m)P(\text{region} = m) + P(f \mid \text{region} \neq m)P(\text{region} \neq m)}$$

where f is the set of features.

Figure 5A:
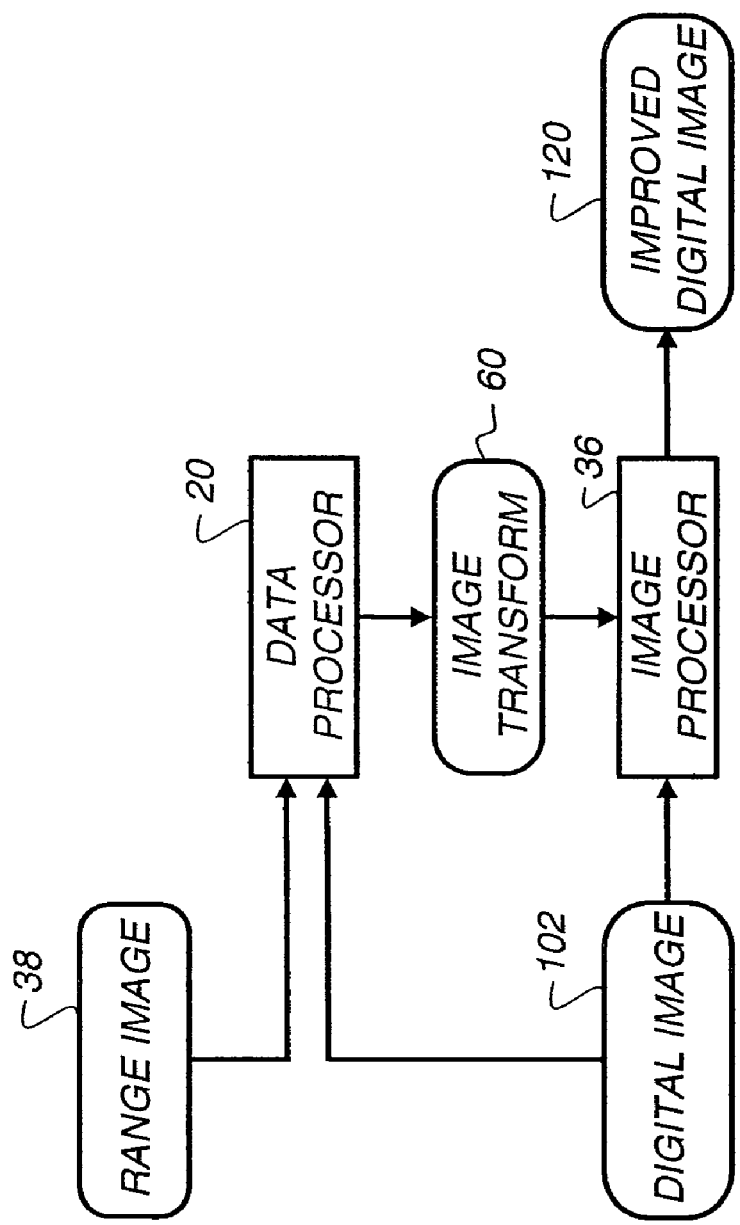
FIG. 5A is a flow chart of an embodiment of the present invention for adjusting exposure of an image based on range information.

FIG. 5A shows a method for using the range map to determine the balance of an image. The digital image 102 and the range image 38 are input to the data processor 20. The data processor 20 determines an image transform 60 (an exposure adjustment amount) that is applied to the digital image 102 by the image processor 36, producing the improved digital image 120. The image transform 60 is an operation that modifies one or more pixel values of an input image (e.g. the digital image 102) to produce an output image (the improved digital image 120).

In a first embodiment, the image transform 60 is used to improve the image balance or exposure. The proper exposure of a digital image is dependent on the subject of the image. Algorithms used to determine a proper image exposure are called scene balance algorithms or exposure determination algorithms. These algorithms typically work by determining an average, minimum, maximum, or median value of a subset of image pixels. (See for example, U.S. Pat. No. 4,945,406).

When the pixel values of the digital image 102 represent the log of the exposure, then the exposure adjustment amount (also called balance adjustment) is applied by simply adding an offset to the pixel values. When the pixel values of the digital image 102 are proportional with the exposure, then the balance adjustment is applied by scaling the pixel values by a constant multiplier.

In either case, the balance adjustment models the physical process of scaling the amount of light in the scene (e.g. a dimming or brightening of the source illumination). Furthermore, when the pixel values of the digital image 102 are rendered pixel values in the sRGB color space, then the balance adjustment is described in U.S. Pat. No. 6,931,131.

Briefly summarized, the balance adjustment is made by applying the following formula to each pixel value:

$$Io = (1-(1-Ii/255)^{(2.065^a)})255$$

Where Io represents an output pixel value, Ii represents an input pixel value, and a is the exposure adjustment amount in stops of exposure. One stop represents a doubling of exposure.

Although in the preceding discussion a balance adjustment is applied to an existing digital image 102, those skilled in the art will recognize that the determined balance could be used by a camera to capture a new image of the scene. For simplicity, the following discussion will assume that the pixel values of the digital image are proportional to log exposure. Those skilled in the art will recognize that various parameters and equations may need to be modified when the digital image pixel values represent other quantities.

A process is used by the data processor 20 to determine the exposure adjustment amount a. The range image 38 is interpolated so that it has the same dimensions (i.e. rows and columns of values) as the digital image 102. Then a weighted exposure value t is determined by taking a weighted average of the exposure values of the digital image 102. Each pixel in the digital image receives a weight based on its corresponding distance from that camera as indicated by the interpolated depth map. The relationship used to determine the weights for the average from the $$t = \Sigma\Sigma W(x, y)i(x, y)$$

where the double summation is over all rows and columns of pixels of the digital image.

Figure 5B:
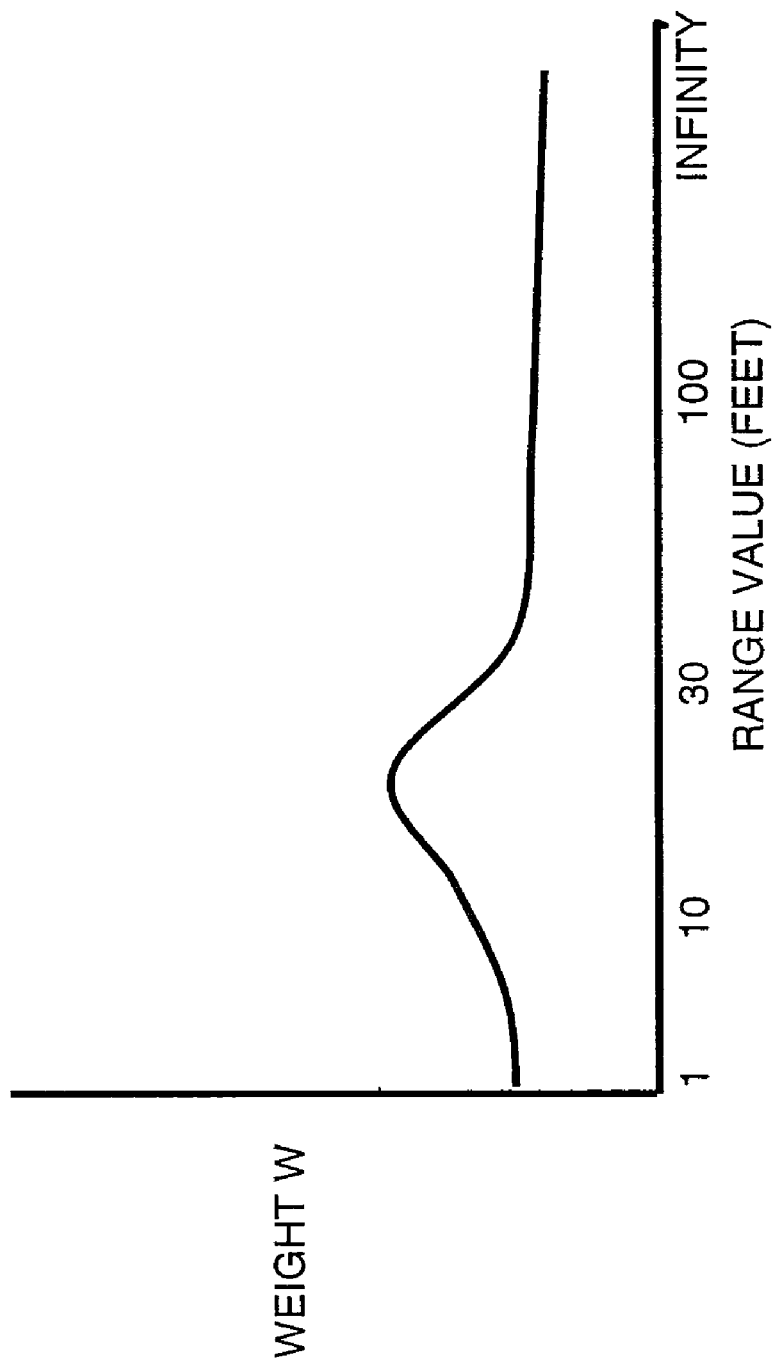
FIG. 5B is a plot of the relationship between range values and relative importance W in an image.

Weight W is a function of the range image value at position (x,y). Typically, W(x,y) is normalized such the sum of W(x,y) over the entire image is zero. The relationship between the weight W and the range value is shown in FIG. 5B. This relationship is based on the distribution in distance of a main subject from the camera. In essence, the relationship is the probability that the range will be a specific distance, given that the pixel belongs to the main subject of the image. In addition to the weight based on the range value, additional weights may be used that are based on for example: location of the pixel with respect to the optical center of the image (e.g. pixels near the center are given greater weight) or edgeiness (pixels located at or near image locations having high edge gradient are given greater weight).

The exposure adjustment amount is then determined by taking the difference of the weighted average with a target value. For example:

$$a = T - t$$

where T is the target value exposure value. Therefore, dark images have a weighted average t less than the target value T are will result in a positive a (indicating the image needs to be lightened). Also, light image have a weighted average t greater than the target value T, resulting in a negative a indicating that the image needs to be darkened. The value T is typically selected by finding the value that optimizes image quality over a large database.

In an alternative embodiment where the range map is a sparse range map, the average value a can be calculated from only those (uninterpolated range values) at the interpolated values of the digital image at corresponding positions.

Figure 5C:
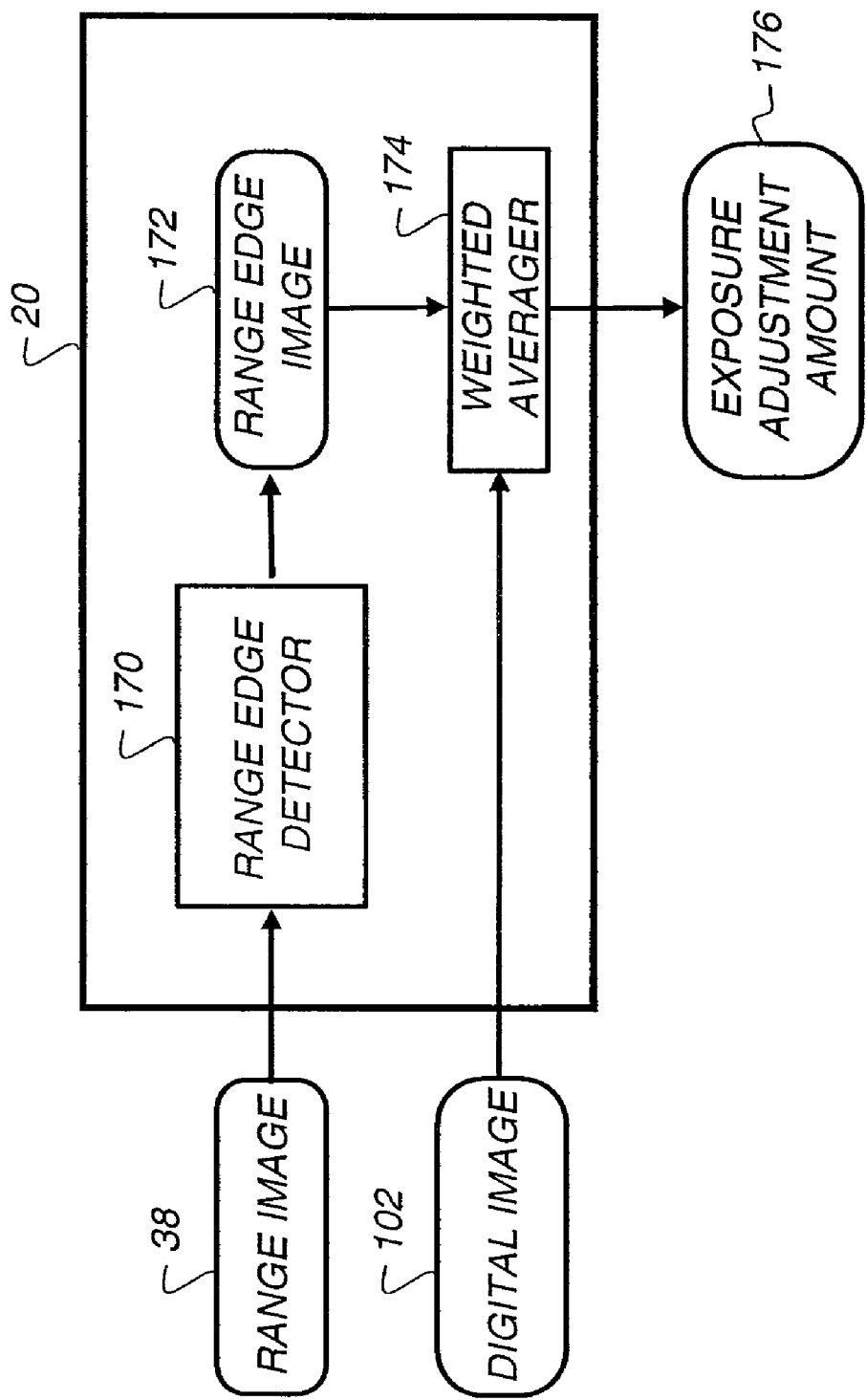
FIG. 5C is a flow chart of an embodiment of the present invention for adjusting exposure of an image based on range information.

Alternatively, the weighted average is calculated by first segmenting the range image by clustering regions (groups of range values that are similar) using for example the well known iso-data algorithm, then determining a weighted average for each region, then computing an overall weighted average by weighting the weighted averages from each region according the a weight derived by the function shown in FIG. 5C using the mean range value for each region.

FIG. 5C shows a detailed view of the data processor 20 that illustrates a further alternative for computing an exposure adjustment amount 176. The range image 38 is operated upon by a range edge detector 170 such as by filtering with the well known Canny edge detector, or by computing the gradient magnitude of the range image at each position followed by a thresholding operation. The output of the range edge detector 170 is a range edge image 172 having the same dimensions (in rows and columns of values) as the range image 38. The range edge image 172 has a high value at positions associated with edges in the range image 38, a low value at positions associated with non-edges of the range image 38, and intermediate value at positions associated with positions in the range image 38 that are intermediate to edges and non-edges. Preferably, the range edge image 172 is normalized such that the sum of all pixel values is one. Then the weighted averager 174 determines the weighted average t of the digital image 102 by using the values of the range edge image 172 as weights. The weighted averager 174 outputs the exposure adjustment amount 176 by finding the difference between t and T as previously described.

Thus a exposure adjustment amount is determined using the range image 38 corresponding to the digital image 102. Furthermore, the range image is filtered with a range edge detector 170 to generate weights (the ramp edge image 172) that are employed to determine a exposure adjustment amount.

Note that although edge detectors are frequently used in the field of image processing, they discover local areas of high code value difference rather than true discontinuities in the scene. For example, edge detectors will often detect the stripes on a zebra although they are merely adjacent areas of differing reflectance rather than a true structural scene edge. The range edge detector will exhibit high response only when local areas contain objects at very different distances, and will exhibit high response for differing material reflectance on a smooth surface in the scene.

Figure 6A:
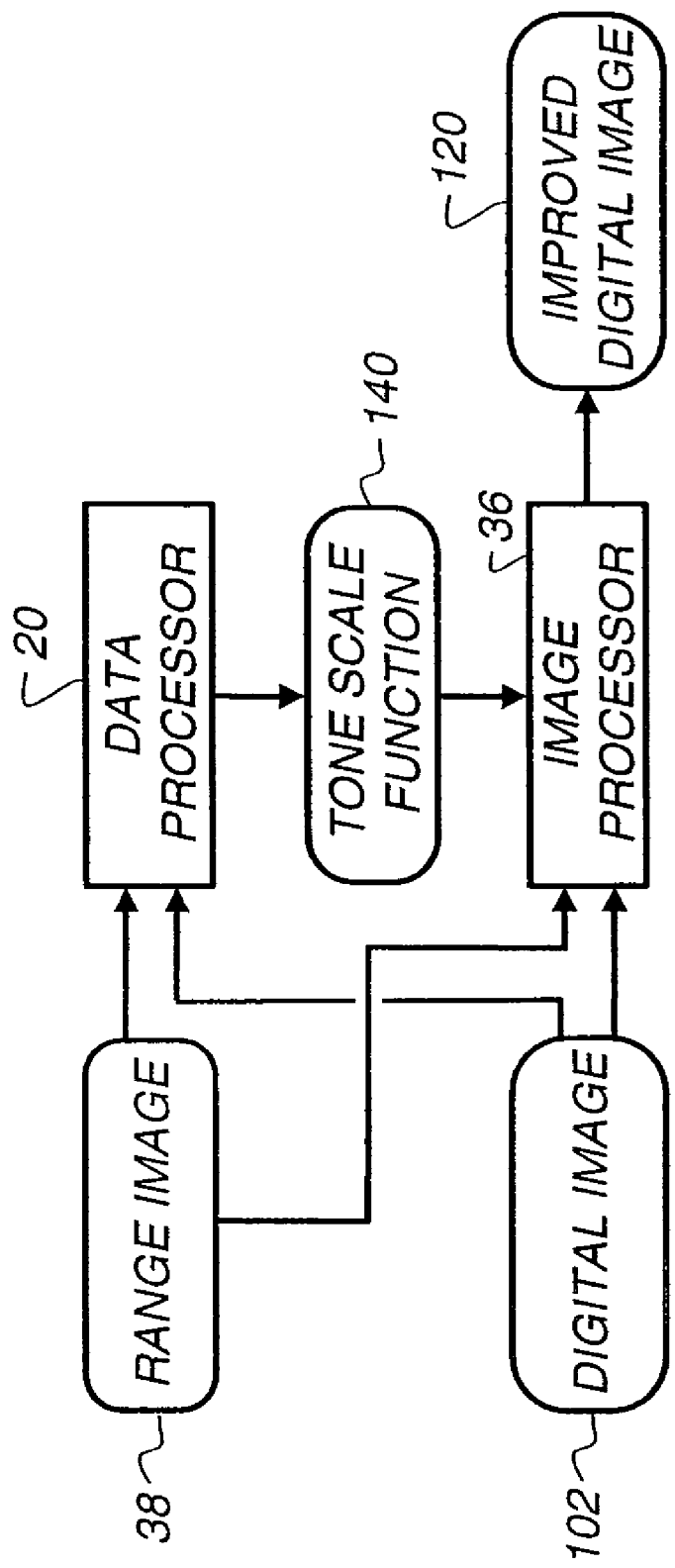
FIG. 6A is a flow chart of an embodiment of the present invention for adjusting tone scale of an image based on range information.

FIG. 6A shows a method for using the range image 38 to determine a tone scale function used to map the intensities of the image to preferred values. This process is often beneficial for the purpose of dynamic range compression. In other words, a typical scene contains a luminance range of about 1000:1, yet a typical print or display can effectively render only about a 100:1 luminance range. Therefore, dynamic range compression can be useful to "re-light" the scene, allowing for a more pleasing rendition.

The digital image 102 and the range image 38 are input to the data processor 20. The data processor 20 determines an image transform (a tone scale function 140) that is applied to the digital image 102 by the image processor 36, producing an improved digital image 120. An image transform is an operation that modifies one or more pixel values of an input image (e.g. the digital image 102) to produce an output image (the improved digital image 120).

Figure 6B:
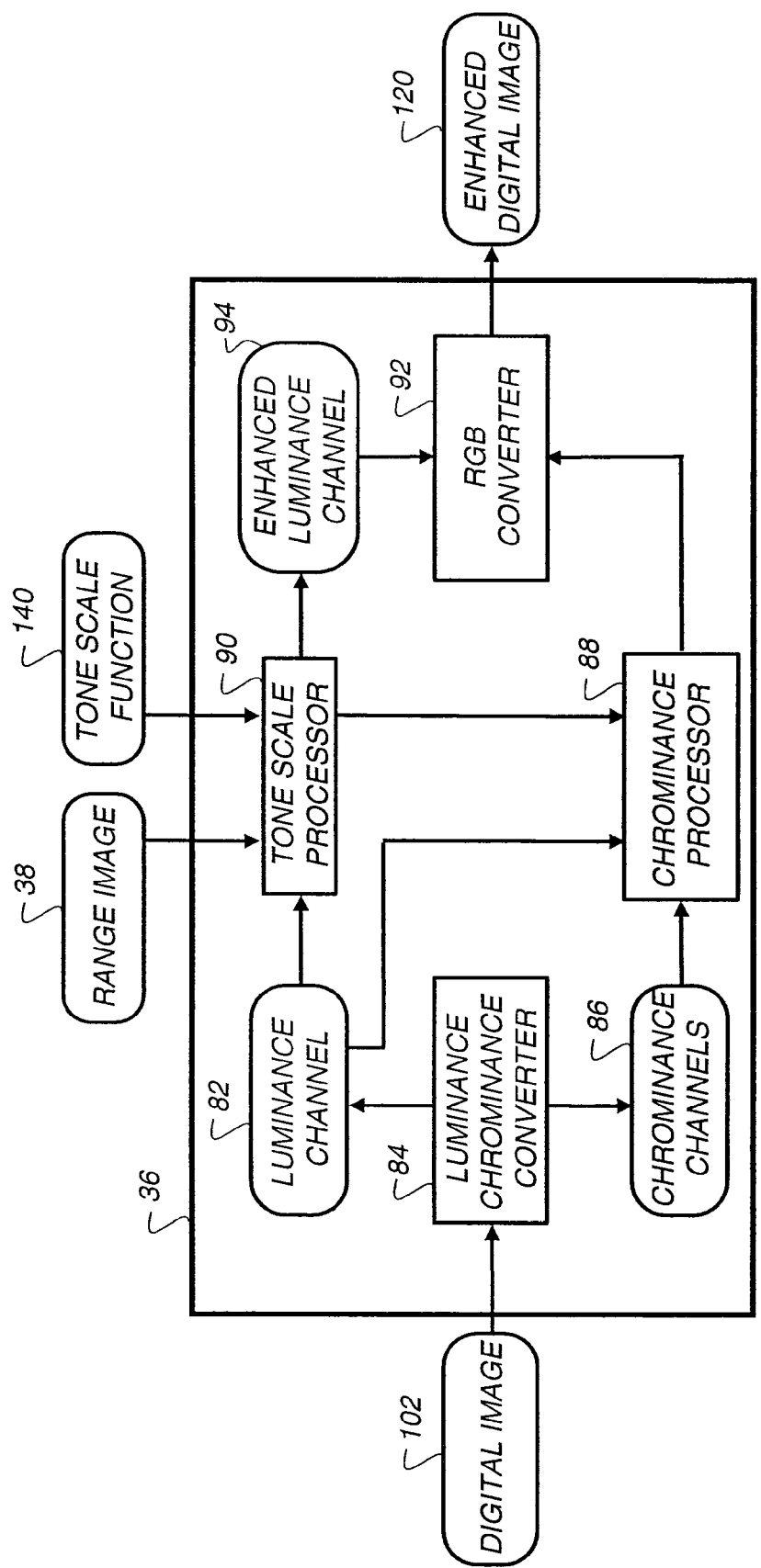
FIG. 6B is a more detailed flow chart an embodiment of the present invention for adjusting tone scale of an image based on range information.

FIG. 6B shows a detailed view of the image processor 36. The digital image, typically in an RGB color space, is transformed to a luminance chrominance color space by a color space matrix transformation (e.g. a luminance chrominance converter 84) resulting in a luminance channel neu 82 and two or more chrominance channels gm and ill 86. The transformation from a set of red, green, and blue channels to a lumi nance and two chrominance channels may be accomplished by matrix multiplication, for example:

$$\begin{bmatrix} neu \\ gm \\ ill \end{bmatrix} = \begin{bmatrix} 1/3 & 1/3 & 1/3 \\ -1/4 & 1/2 & -1/4 \\ -1/2 & 0 & 1/2 \end{bmatrix} \begin{bmatrix} red \\ grn \\ blu \end{bmatrix}$$

where neu, gm, and ill represent pixel values of the luminance and chrominance channels and red, grn, and blu represent pixel values of the red, green, and blue channels of the digital image 102.

This matrix rotation provides for a neutral axis, upon which r=g=b, and two color difference axes (green-magenta and illuminant). Alternatively, transformations other than provided by this matrix, such as a 3-dimensional Look-Up-Table (LUT), may be used to transform the digital image into a luminance-chrominance form, as would be known by one ordinarily skilled in the art given this disclosure.

The purpose for the rotation into a luminance-chrominance space is to isolate the single channel upon which the tone scale function operates. The purpose and goal of a tone scale processor 90 is to allow a tone scale function to adjust the macro-contrast of the digital image channel but preserve the detail content, or texture, of the digital image channel. To that end, the tone scale processor 90 used the range image 38, the tone scale function 140 and the luminance channel 82 to generate an enhanced luminance channel 94. The chrominance channels are processed conventionally by a conventional chrominance processor 88. The chrominance processor 88 may modify the chrominance channels in a manner related to the tone scale function. For example, U.S. Pat. No. 6,438,264 incorporated herein by reference, describes a method of modifying the chrominance channels related to the slope of the applied tone scale function. The operation of the chrominance processor is not central to the present invention, and will not be further discussed.

The digital image is preferably transformed back into RGB color space by an inverse color space matrix transformation (RGB converter 92) for generating an enhanced improved digital image 120 for permitting printing a hardcopy or display on an output device.

Figure 6C:
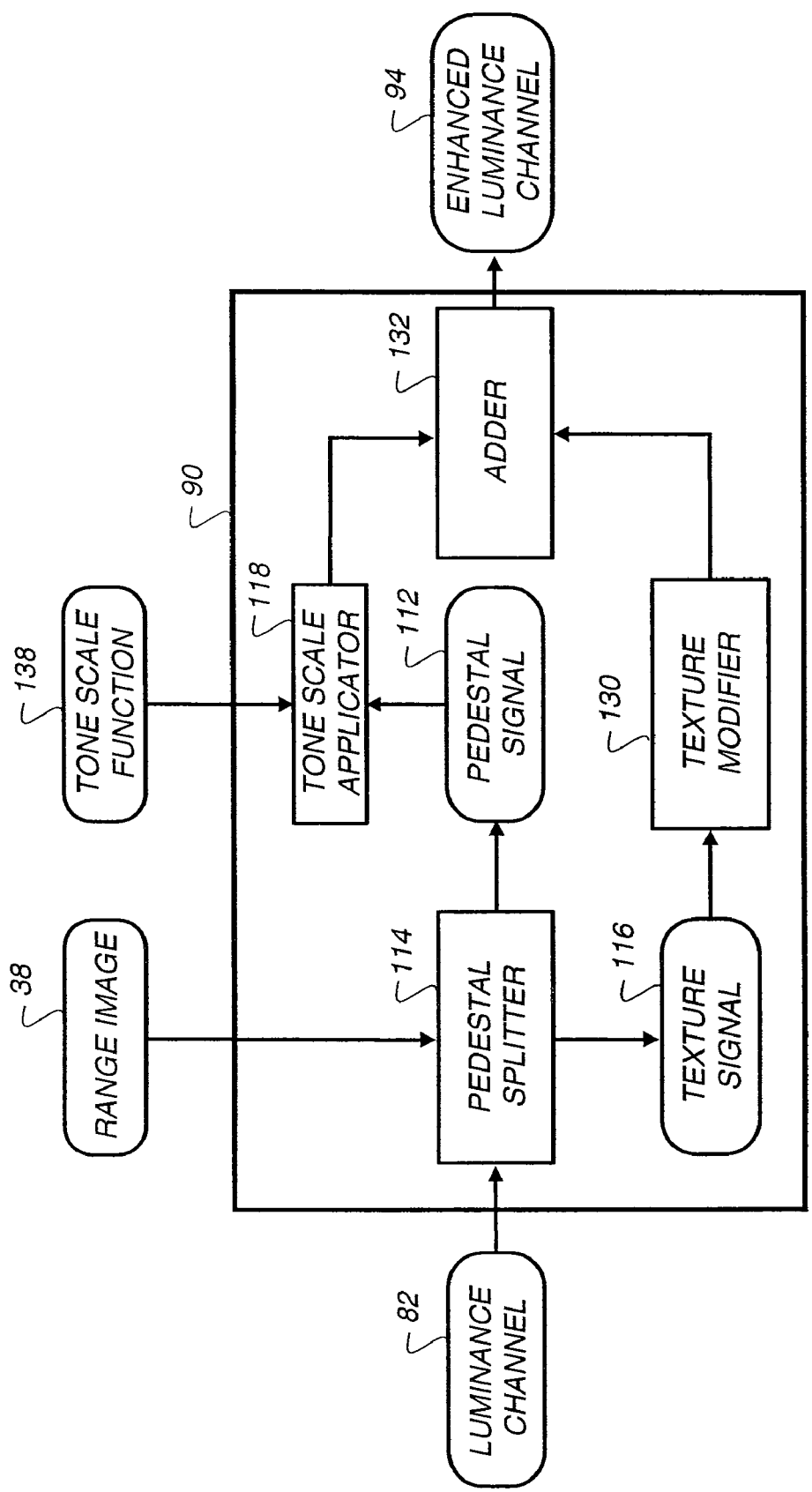
FIG. 6C is a flow chart of an embodiment of the present invention for adjusting tone scale of an image based on range information.

Referring to FIG. 6C, there is shown a more detailed view of the tone scale processor 90. The luminance channel neu 82 is expressed as the sum of the pedestal signal $neu_{ped}$, the texture signal $neu_{txt}$ and a noise signal $neu_n$:

$$neu = neu_{ped} + neu_{txt} + neu_n \quad (1)$$

If the noise is assumed to be negligible, then:

$$neu = neu_{ped} + neu_{txt} \quad (2)$$

The luminance portion neu 82 of the digital image channel output by the luminance/chrominance converter 84 is divided into two portions by a pedestal splitter 114 to produce a pedestal signal $neu_{ped}$ 112 and a texture signal $neu_{txt}$ 116, as described in detail below. A tone scale function 138 is applied to the pedestal signal 112 by a tone scale applicator 118 in order to change the characteristics of the image for image enhancement. The tone scale function 138 may be applied for the purposes of altering the relative brightness or contrast of the digital image. The tone scale applicator 118 is implemented by application of a look up table (LUT), to an input signal, as is well known in the art. An example tone scale function showing a 1 to 1 mapping of input values to output values is illustrated in FIG. 6D. The tone scale function 138 can be independent of the image, or can be derived from an analysis of the digital image pixel values, as for example described in U.S. Pat. No. 6,717,698. This analysis is performed in the data processor 20 as shown in FIG. 6A. The data processor 20 may simultaneously consider the range image 38 along with the pixel values of the digital image 102 when constructing the tone scale function 140. For example, the tone scale function 140 is computed by first constructing an image activity histogram from the pixel values of the digital image corresponding to neighborhoods of the range image 38 having a variance greater than a threshold $T_3$. Thus, the image activity histogram is essentially a histogram of the pixel values of pixels near true occlusion boundaries, as defined by the range image 38. Then an image dependent tone scale curve is constructed from the image activity histogram in the manner described in U.S. Pat. No. 6,717,698.

A texture signal 116 may be amplified by a texture modifier 130 if desired, or altered in some other manner as those skilled in the art may desire. This texture modifier 130 may be a multiplication of the texture signal 116 by a scalar constant. The modified texture signal and the modified pedestal signal are then summed together by an adder 132, forming an enhanced luminance channel 94. The addition of two signals by an adder 132 is well known in the art. This process may also be described by the equation:

$$neu_p = \text{function}.(neu_{ped}) + neu_{txt} \quad (3)$$

where function.( ) represents the application of the tone scale function 138 and $neu_p$ represents the enhanced luminance channel 94 having a reduced dynamic range. The detail information of the digital image channel is well preserved throughout the process of tone scale application.

Despite what is shown in FIG. 6B, it is not a requirement that a luminance channel undergo the modification by the tone scale processor 90. For example, each color channel of an RGB image could undergo this processing, or a monochrome image could be transformed by this process as well. However, for purpose of the remainder of this application it is assumed that only the luminance channel, specifically, the neutral channel neu, will undergo processing by the detail preserving tone scale function applicator.

Referring again to FIG. 6C, the pedestal splitter 114 decomposes the input digital image channel neu into a "pedestal" signal 112 $neu_{ped}$ and a "texture" 116 signal $neu_{txt}$, the sum of which is equal to the original digital image channel (e.g., luminance signal) 82. The operation of the pedestal splitter 114 has a great deal of effect on the output image. The pedestal splitter 114 applies a nonlinear spatial filter having coefficients related to range values from the range image 38 in order to generate the pedestal signal 112. The pedestal signal 112 $neu_{ped}$ is conceptually smooth except for large changes associated with major scene illumination or object discontinuities. The texture signal 116 $neu_{txt}$ is the difference of the original signal and the pedestal signal. Thus, the texture signal is comprised of detail.

The pedestal signal is generated by the pedestal splitter 114 by applying a nonlinear spatial filter to the input luminance channel neu 82. The filter coefficients are dependent on values of the range image 38.

$$n_{ped}(x, y) = \sum_{m=-M}^{M} \sum_{n=-N}^{N} w(m, n) n(x + m, y + n)$$

where
the nonlinear filter is w(m,n) and the coefficients are calculated according to:

$$w(m,n) = w_1(m,n) w_2(R(x,y), R(x+m, y+n))$$

where
$w_1(m,n)$ acts to place a Gaussian envelope and limit the spatial extent of the filter.

$$w_1(m,n) = \frac{1}{2\pi\sigma^2} \exp\left[-\frac{x_0^2 + y_0^2}{2\sigma^2}\right]$$

where
$\pi$ is the constant approx. 3.1415926
$\sigma$ is a parameter that adjusts the filter size. Preferably, $\sigma=0.25$ times the number of pixels along the shortest image dimension. and $w_2(m,n)$ serves to reduce the filter coefficients to prevent blurring across object boundaries which are accompanied by a large discontinuity in the range image 38.

$$w_2(a,b) = \exp\left[-\frac{T_4 \max(a,b)}{\min(a,b)}\right]$$

where $T_4$ is a tuning parameter that allows adjustment for the steepness of the attenuation of the filter across changes in the range image 38. The filter coefficient at a particular position decreases as the corresponding range value becomes more different from the range value corresponding to the position of the center of the filter. Typically, before application the sum of the coefficients of the filter w are normalized such that their sum is 1.0.

Thus, an image's tone scale is improved by filtering the image with weights derived from an analysis of range values from the range image describing the distance of objects in the scene from the camera.

The term "adaptive" in regard to the inventive filter design refers to the construction of a filter whose weights vary in accordance with the structure in a neighborhood of the filter position. In other words, the invention filters the digital image signal through a filter having coefficients that are dependent upon statistical parameters of range values corresponding to the neighborhood of the particular pixel being filtered.

Those skilled in the art will recognize that the filter w may be approximated with a multi-resolution filtering process by generating an image pyramid from the luminance channel 82 are filtering one or more of the pyramid levels. This is described for example in U.S. Patent Application Publication No. 2004/0096103. In addition, the filter w may be an adaptive recursive filter, as for example described in U.S. Pat. No. 6,728,416.

In addition to the weight based on the range value and the Gaussian envelope, additional weights may be used that are based on for example: location of the pixel with respect to the optical center of the image (e.g. pixels near the center are given greater weight) or edgeiness (pixels located at or near image locations having high edge gradient are given greater weight).

The tone scale of the image can also be modified directly by modifying the luminance channel of the image as a function of the range image 38. The improved digital image 120 is created by modifying the luminance channel as follows:

The filter coefficients are dependent on values of the range image 38.

$$neu_p(x,y) = f(neu(x,y), R(x,y)) \quad (4)$$

This equation allows for the intensity of the image to be modified based on the range value. This is used to correct for backlit or frontlit images, where the image lighting is non-uniform and generally varies with range. When the image signal neu(x,y) is proportional to the log of the scene exposure, a preferable version of the equation (4) is:

$$neu_p(x,y) = f(R(x,y)) + neu(x,y) \quad (5)$$

The function f( ) is formed by an analysis of the image pixel values and corresponding range values, such that application of equation (5) produces an enhanced luminance channel 94 having reduced dynamic range. The detail information of the digital image channel is well preserved throughout the process of tone scale application.

Referring back to FIG. 1 the camera 10 integrally includes a range image sensor 32 for measuring physical distances between the camera 10 and objects in the scene at arbitrary times. In a digital video sequence (i.e. a collection of digital images captured sequentially in time from a single camera), a corresponding range image sequence is generated by the depth image sensor 32. The n range images are represented as vector Rn.

The invention has been described in detail with particular reference to certain preferred embodiments thereof, but it will be understood that variations and modifications can be effected within the spirit and scope of the invention.

| PARTS LIST | |
|---|---|
| 10 | camera |
| 15 | capture button |
| 20 | data processor |
| 22 | user input device |
| 30 | display device |
| 32 | range image sensor |
| 33 | focus mechanism |
| 34 | image sensor |
| 36 | image processor |
| 38 | range image |
| 39 | planar surface model |
| 40 | control computer |
| 41 | first step |
| 42 | operation mode |
| 43 | second step |
| 45 | third step |
| 60 | image transform |
| 70 | memory device |
| 82 | luminance channel |
| 84 | luminance chrominance converter |
| 86 | chrominance channels |
| 88 | chrominance processor |
| 90 | tone scale processor |
| 92 | RGB converter |
| 94 | enhanced luminance channel |
| 102 | digital image |
| 112 | pedestal signal |
| 114 | pedestal splitter |
| 116 | texture signal |
| 118 | tone scale applicator |
| 120 | improved digital image |
| 121 | updated range image |
| 130 | texture modifier |
| 132 | adder |
| 138 | tone scale function |
| 140 | tone scale function |
| 142 | planar surface |
| 144 | planar type classifier |
| 146 | geometric transform |
| 150 | image mask generator |
| 152 | image mask |
| 154 | material/object detector |
| 162 | belief map |
| 170 | range edge detector |

-continued

PARTS LIST

| 172 | range edge image |
| 174 | weighted averager |
| 176 | exposure adjustment amount |

The invention claimed is:

1. A method of adjusting exposure of a digital camera based on range information, comprising:
   (a) a digital camera capturing a first digital image at a selected exposure of a scene having objects;
   (b) providing range information having two or more range values indicating the distance from the digital camera to objects in the scene;
   (c) applying a spatial filter to the range information to detect range edges, and using the range edges and pixel values of the captured digital image to determine an exposure adjustment amount for the selected exposure; and
   (d) applying the exposure adjustment amount to the digital image to produce a second digital image with adjusted exposure.

2. The method of claim 1, wherein step b further includes:
   (i) using the range edges to determine a set of weighting coefficients; and
   (ii) using the weighting coefficients and the digital image to determine an exposure adjustment amount.

3. The method claim 2, wherein the weighting coefficients indicate the relative importance within the digital image based on the range edges.

4. The method of claim 2, further including:
   (e) adjusting the tone scale of the second digital image based on range edges.

5. A method of adjusting exposure of a captured digital image of a scene having objects, comprising:
   (a) providing range information having two or more range values indicating the distance of objects in the scene;
   (b) applying a spatial filter to the range information to detect range edges, and using the range edges and pixel values of the captured digital image to determine an exposure adjustment amount for the selected exposure; and
   (c) applying the exposure adjustment amount to the captured digital image to produce a second digital image with adjusted exposure.

6. The method of claim 5, wherein step b) further includes:
   (i) using the range edges-to determine a set of weighting coefficients; and
   (ii) using the weighting coefficients and the digital image to determine a exposure adjustment amount.

7. The method claim 6, wherein the weighting coefficients indicate the relative importance within the digital image based on the range edges.

8. The method of claim 5, further including:
   d) adjusting the tone scale of the second digital image based on range edges.

9. The method of claim 8, wherein step d) includes:
   i) dividing the captured digital image into a pedestal signal and a texture signal;
   (ii) applying a tone scale function to the pedestal signal to produce a modified pedestal signal, wherein range information is used in step i; and
   (iii) adding the texture signal to the modified pedestal signal to produce the second digital image with adjusted tone scale.

10. A method of adjusting tone scale of a captured digital image of a scene having objects, comprising:
    (a) providing range information having two or more range values indicating the distance of objects in the scene;
    (b) applying a spatial filter to the range information to detect range edges, and using the range edges and pixel values of the captured digital image to determine a tone scale adjustment; and
    (c) applying the tone scale adjustment to the captured digital image to produce a second digital image with adjusted tone scale.

11. The method of claim 10, wherein step b includes:
    (i) dividing the captured digital image into a pedestal signal and a texture signal;
    (ii) applying a tone scale function to the pedestal signal to produce a modified pedestal signal, wherein range information is used in step(i) or in step(ii) or both; and
    (iii) adding the texture signal to the modified pedestal signal to produce the second digital image with adjusted tone scale.

12. The method of claim 11, wherein step b) i) includes filtering a pixel of the captured digital image using weights derived from an analysis of range values from the range image.

* * * * *